United States Patent [19]
McInnes

[11] Patent Number: 6,024,139
[45] Date of Patent: Feb. 15, 2000

[54] APPARATUS AND METHOD FOR INJECTING FLUID INTO INFLATED TIRES

[76] Inventor: Robert P. McInnes, 17 Bamboo Dr., Briney Breezes, Fla. 33435

[21] Appl. No.: 09/263,574

[22] Filed: Mar. 8, 1999

Related U.S. Application Data

[63] Continuation-in-part of application No. 09/039,478, Mar. 16, 1998.

[51] Int. Cl.$^7$ ...................................................... B65B 31/00
[52] U.S. Cl. .................................. 141/38; 141/5; 152/415
[58] Field of Search ...................... 141/38, 5, 9; 152/415; 137/223, 231, 234.5; 156/115; 81/177.7, 177.8; 72/369, 367.1, 480, 479, 477, 152; 29/221.5

[56] References Cited

U.S. PATENT DOCUMENTS 2,732,743  1/1956  Hart .......................................... 72/458

*Primary Examiner*—Henry J. Recla
*Assistant Examiner*—Huyen Le
*Attorney, Agent, or Firm*—Alvin S. Blum

[57] ABSTRACT

The invention provides apparatus and methods for injecting fluid such as sealing and balancing fluid into tires while they are inflated and mounted on wheels and especially for two tires mounted on a dual rim wheel. The invention overcomes problems of limited access to the valve stems and includes tools for bending the stem in place to facilitate application of the apparatus.

9 Claims, 3 Drawing Sheets

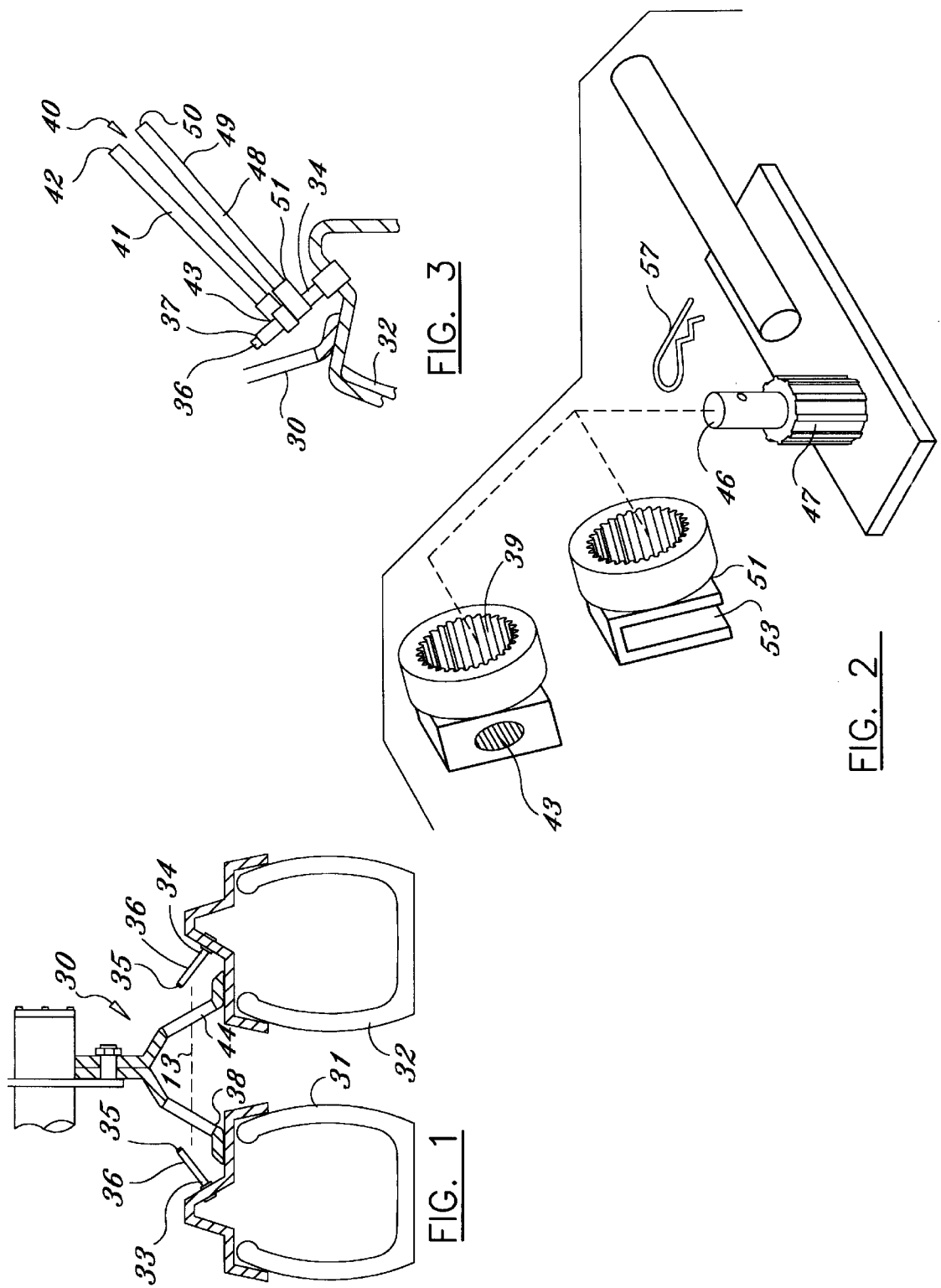

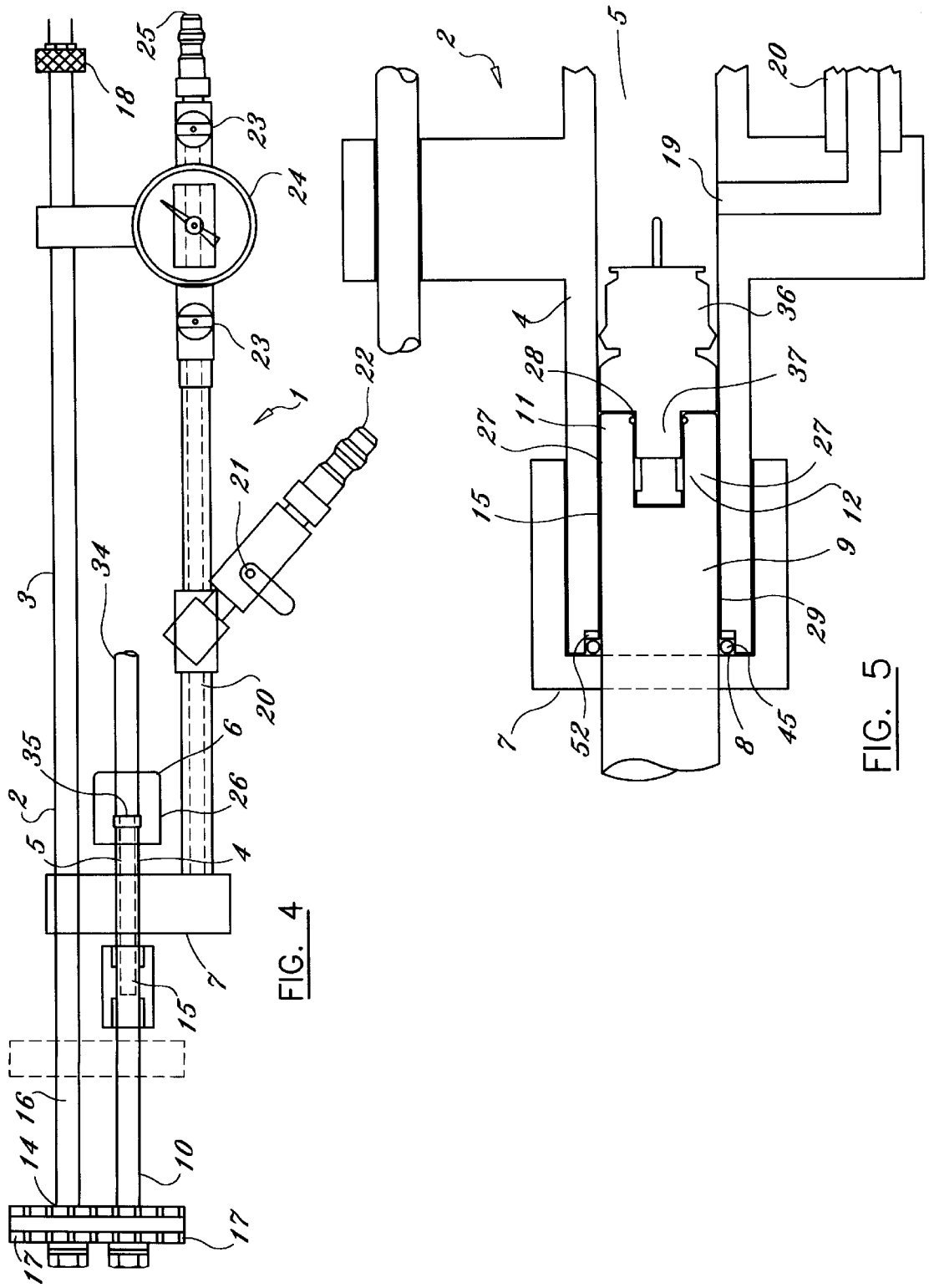

APPARATUS AND METHOD FOR INJECTING FLUID INTO INFLATED TIRES

This is a continuation in part of U.S. patent application Ser. No. 09/039478 filed Mar. 16, 1998, incorporated herein by reference.

BACKGROUND OF THE INVENTION

This invention relates to apparatus for introducing sealing and balancing fluid into pneumatic tires and more particularly to devices for doing so while the tire remains pressurized and even mounted beside another tire on a vehicle.

U.S. Pat. No. 4,308,766 issued Jan. 5, 1982 to Myers reviews the problems inherent in introducing fluid sealant into a tire through the valve stem and the advantages of being able to do this without first deflating the tire. It discloses a device for unscrewing and removing the valve core, injecting the fluid, and replacing the valve core while the tire remains inflated.

One of the most important applications for such a device is on heavy duty trucks. The tires are mounted in a parallel pair on a dual tire rim. The valve stems are both mounted so that they extend toward one another on a common side. Access to the stems is through small openings in the wheel.

Myers teaches a structure with a laterally extending fluid inlet tube adjacent the stem connector that could not pass through the small openings to access the stems. It would be most useful to have a tool which can be used to inject sealing and/or balancing fluid into tires while they remain inflated and mounted on a dual tire rim wheel.

In Applicant's parent application Ser. No. 09/39478 filed Mar. 16, 1998 apparatus and method for injecting sealing and blancing fluid into already pressurized tires are described, in which separate elements must be serially attached and removed to perform the various steps required in the process. Improvements herein disclosed incorporate the various elements into a manifold, to reduce the number of parts and greatly simplify the process so that it may be employed by users with less training and skill.

SUMMARY OF THE INVENTION

It is accordingly an object of the invention to provide tools that will enable a user to inject fluid into tires while they are mounted on dual rims and inflated. It is a further object that they provide means to unscrew the valve core, remove the valve core from a fluid injection path to provide a passage for the fluid unobstructed by the valve core, reinsert and screw in the valve core after the fluid has been injected, and all while the tire is inflated on a dual rim with limited access to the valve stem.

These and other objects, advantages and features of the invention will become more apparent when the detailed description is studied in conjunction with the drawings, in which like reference characters designate like elements in the various drawing figures.

BRIEF DESCRIPTION OF THE DRAWINGS

FIG. 1 is a sectional view of two tires mounted on a dual wheel.

FIG. 2 is an exploded view of a tire valve stem bender.

FIG. 3 is a side elevation view of the valve stem bender bending the stem of an outboard tire while the tire is pressurized.

FIG. 4 is a top view of the first manifold mounted on an outboard tire valve stem.

FIG. 5 is a sectional detail of a portion of the manifold of FIG. 4.

DETAILED DESCRIPTION OF PREFERRED EMBODIMENTS

Figure 6:
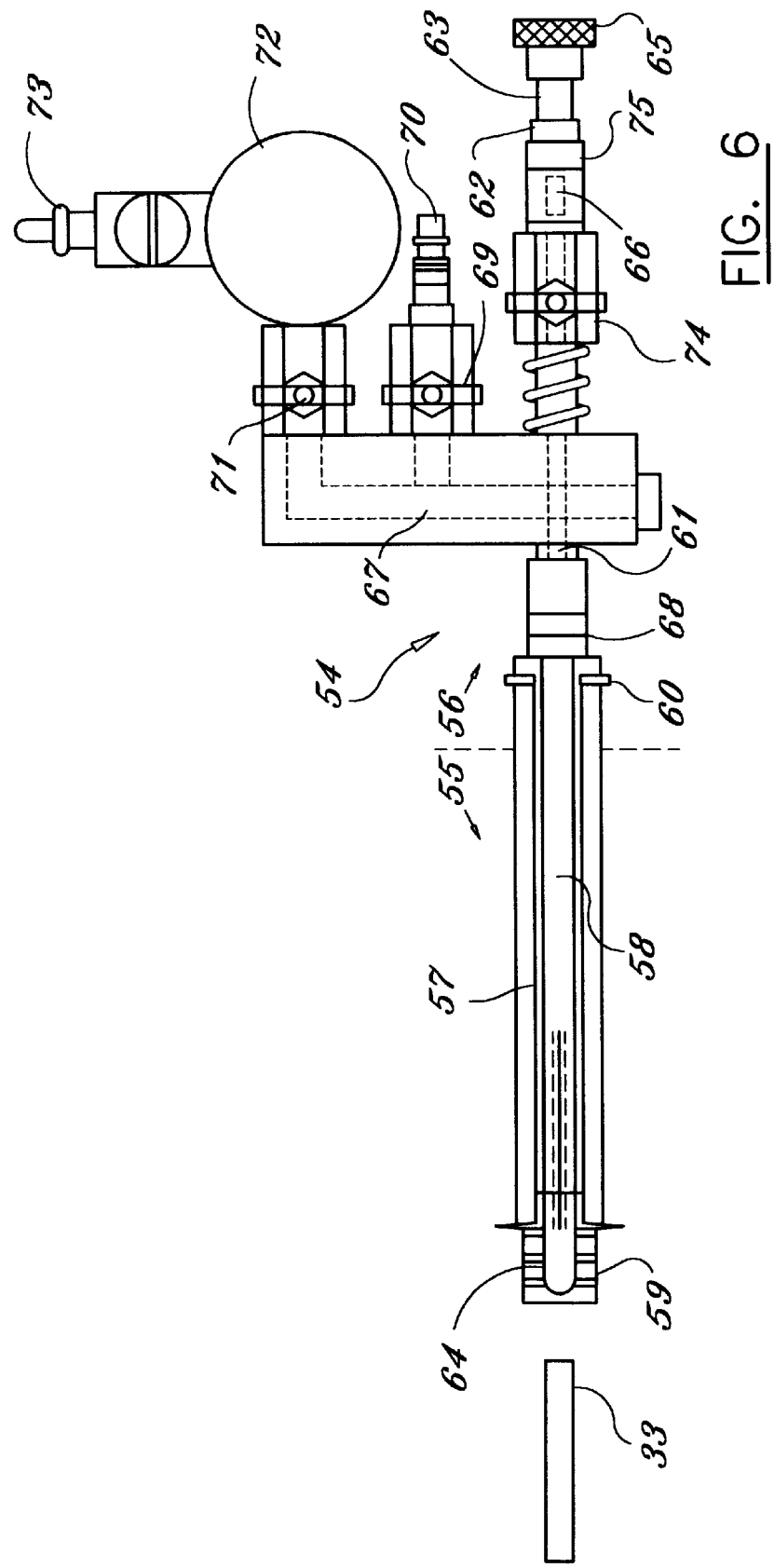
FIG. 6 is a top view of the second manifold for use with an inboard tire valve stem.

Referring now first to FIGS. 1–3, a dual rim wheel 30 such as those mounted on heavy duty trucks is shown with an inboard tire 31 and an outboard tire 32 mounted on the wheel. Valve stems 33 and 34 are positioned at access apertures 38,44 to provide access for pressure testing and inflation at the valve stem ports 35. The angle of the stems may make it difficult to remove the valve cores 36 and pump sealant therein because access is so limited by the small apertures. It may be necessary to bend the valve stems of one or both tires while the tires are mounted and pressurized to permit the manifolds of the invention to be applied to the valve stems. The stems may be bent in place to the positions indicated by phantom lines 13 by use of the stem bender 40 of the invention. The bender 40 comprises an elongate stem bending lever 41 having a handle 42 at a first extremity and a stem receiving cylindrical passage 43 at a second extremity for receiving therethrough the free end of the valve stem. The cylindrical passage 43 is pivotally mounted on an axle 46 orthogonal to the long axis of the lever 41 to adjust the angle as required. The adjustable angle is fixed by means of the splined connection 47 cooperating with the inner gear 39 that is held in place by hairpin 57 through hole 58 in the axle 46.

The bender 40 may also include valve stem holder 48 having an elongate shaft 49, a handle 50 at one end and a stem engaging member 51 at another end that is pivotally mounted on axle 46 by adjustable angle means as described for the bending lever 41. The stem engaging member 51 has a slot 53 that is open at both ends and one side so that it may be easily placed on a stem close to the rim to hold the stem steady while bending the stem with lever 41. The holder is then easily removed from the bent stem. Because the bend forms between the holder 48 and the lever 41, the lever 41 is easily pulled free of the straight free end of a bent stem. This bender may also be employed to bend a stem to facilitate application of a compressed air chuck or a tire pressure gauge.

When the wheel holds the stem securely, holder 48 may not be required when bending the stem with the bender lever 41.

Referring now to FIGS. 4 and 5, apparatus and method for introducing tire sealant and balance fluid into the outboard tire through tire valve stem 34 will be described using first manifold 1. Manifold 1 has an anterior portion 2 that is small enough in dimension to fit through the first access aperture while holding the manifold by the posterior portion 3. Anterior portion 2 has a first body member 4 with an elongate straight bore 5 open at a first end that is provided with a quick release hydraulic sealing connector 6 of the type well known in the art, in which pulling on the outer knurled sleeve 26 disengages the connector from its grass on the outer threads of the stem 34. The bore 5 is closed at a second end by a wall 7 with an axial hole 8 therethrough. An elongate control shaft 9 extends through hole 8 and has a first shaft end 10 outside the bore and a second shaft end 11 within the bore having a valve core engaging element 12. Element 12 has two resilient prongs 27 with chamfered edges 28 adjacent a central gap for receiving the rectangular extending portion 37 of valve core 36. O-ring 45 seals the bore to the shaft 9 providing a freely translating and rotating seal so that the valve engaging element 12 may be advanced through the bore and the valve port onto the valve core and rotated to unscrew the core and then pull the core and element back through the bore until the sleeve 29 swaged on the shaft butts up against washer 52. This puts the core in the storage position 15. In practice, the air presure in the tire usually blows the core and shaft to this position. Since the shaft end 10 is inaccessible to the operator, control means 14 is provided to enable an operator at the posterior portion to rotate and translate the control shaft with knurled control element 18 attached to the secondary shaft 16 that is supported by a channel 52 in body member 4. Gear pair 17 causes the control shaft to rotate opposite to the secondary shaft and to translate together.

When the core has been stored at position 15, sealant fluid may be pumped into the tire through the connector 22 and control valve 21 attached to tubular passage 20 that is in communication with the axial bore 5 through lateral bore 19 without interference from the core. After dispensing the fluid, valve 21 is closed and air supply valves 23 and air gauge 24 are used to blow any sealant in the lines into the tire with an air supply attached to connector 25. Then the core is moved into the stem port and screwed tightly in place and manifold 1 removed.

Referring now to FIG. 6, apparatus and method for injecting tire sealant and balance fluid into the inboard tire through valve stem 33 will now be disclosed.

A second manifold 54 has an anterior portion 56 that is small enough to pass through the first and second access apertures of the wheel. It has an elongate tubular body member 57 with s straight through axial bore 58 that is open at a first end that has a quick connect hydraulic connector 59 that seals to the threaded outer surface of the valve stem port. It is much like the connector of the first manifold except that it is provided with a remote release assembly 60 for retracting the sleeve and releasing the connector from the posterior portion 56 away from the wheel when the operation is finished.

The body member 57 is connected to the posterior portion 56 by sealing connector 68 aligning the axial bore 58 with coaxial passage 61 in the posterior portion. The passage 61 terminates in wall 62 that has an axial hole therethrough that is sealed by an O-ring as described for the first manifold. An elongate control shaft 63 operated by knurled knob 65 is slidable within the bore 58 and passage 61 and terminates in core engaging element 64 for engaging, unscrewing, and moving the core to the storage position 66. A valve 74 with a through bore and a quick connector 75 may optionally be provided so that the core may be removed and replaced if desired without deflating the tire. A lateral bore 67 in the posterior portion communicates between the axial passage 61 and valve 69 and connector 70 to a supply of sealant fluid and also to valves 71, gauge 72 and connector 73 to a supply of compressed gas or air as described supra.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. Apparatus for injecting tire sealant and balancing fluid into two inflated tires mounted side by side on a dual wheel that has a removable threaded valve core in a valve stem port in a valve stem for each tire, in which the first valve stem port is for the outboard tire and is inwardly directed adjacent a first access aperture in the wheel and the second valve stem port is for the inboard tire and is outwardly directed and accessible through the first access aperture and a second access aperture in series, the apparatus comprising:

I) a first manifold for use with the first valve stem, the first manifold comprising:
an anterior portion connected to a posterior portion, the anterior portion dimensioned for passing through the first access aperture and having:
a first body member with an elongate straight axial bore open at a first end that is provided with a connector means for sealed communication with the first valve port and closed at a second end by a wall with an axial hole therethrough;
an elongate control shaft extending through the axial hole and having a first shaft end outside the wall and a second shaft end within the bore that is provided with a valve engaging element;
control means connected to the first shaft end for rotating the shaft and valve core and for axial translation of the shaft and a valve core to move the valve core to a storage position in the bore adjacent the wall;
the control means further comprising a secondary shaft rotatably mounted parallel to the control shaft and coupled to the first shaft end by gear means for rotating the control shaft in a direction opposite the direction of rotation of the secondary shaft, the secondary shaft being longer than the control shaft and terminating in the posterior portion in a control element for operator rotation and translation away from the access apertures;
a lateral bore in the body member communicating at a first end with the axial bore between the storage position and the open end and communicating at a second end with a tubular passage extending to the posterior portion where the tubular passage communicates with a valve and connector for connection to a supply of tire sealant and balancing fluid and a valve, gauge and connector for connection to a source of compressed gas;

II) a second manifold for use with the second valve stem, the second manifold comprising:
an anterior portion connected to a posterior portion, the anterior portion dimensioned for passing through the first and second access apertures and having:
an elongate body member with a through axial bore open at a first end that is provided with a connector means for sealed communication with the second valve port, the connector means being provided with a remote control for operation outside the first and second apertures;
the posterior portion connected to the body member and having an axial passage coaxial with the axial bore in the body member, the passage terminating in a wall with an axial hole therethrough;
an elongate control shaft passing through the axial hole and having a first shaft end outside the wall and a second shaft end within the passage that is provided with a valve core engaging element;
shaft control means connected to the first shaft end for rotating the shaft and for axial translation of the shaft and a valve core engaged by the valve core engaging element to move the valve core from the valve stem through the bore and the passage to a storage position in the passage adjacent the wall;

a lateral bore in the posterior portion communicating at a first end with the axial passage between the storage position and the elongate body member connection, and communicating at a second end with a valve and connector for connecting to a supply of tire sealant and balancing fluid and a valve, gauge and connector for connection to a source of compressed gas; and III) a tire stem bender means for bending the tire stem on a mounted, inflated tire to position the stem for access by the first or second manifold.

2. The apparatus according to claim 1, in which the wall of the first manifold and the wall of the second manifold are provided with sealing means for sealing the respective shafts that translate therethrough.

3. The apparatus according to claim 2, in which the axial passage of the second manifold is provided with a valve with a sealable axial through passage positioned between the storage position and the lateral bore.

4. The apparatus according to claim 2, in which the valve engaging element comprises two parallel resilient prongs spaced apart by a gap, with the inner edges of the prongs being chamfered to spread apart and grasp the valve core therebetween.

5. A method for introducing tire sealant and balancing fluid into two inflated tires that are mounted side by side on a dual wheel that has a removable threaded valve core in a valve stem port for each tire, in which the first valve stem port is for the outboard tire and is inwardly directed adjacent a first access aperture in the wheel and the second valve stem port is for the inboard tire and is outwardly directed and is accessible through the first access aperture and a second access aperture in series, the method comprising:

I) providing a first manifold having an anterior portion with a connector that is dimensioned for passing through the first access aperture, and a posterior portion;

passing the anterior portion through the first aperture;

sealingly connecting the connector to the first valve port to prevent pressure loss;

advancing a valve core engaging element attached to a control rod through the connector and engaging the valve core inside the the valve stem port;

unscrewing the valve core by rotation of a secondary shaft operated by a control element at the posterior portion away from the access aperture;

retracting the valve core back to the posterior portion without releasing the tire pressure;

introducing tire sealant and balancing fluid from the posterior portion forward of the valve core through the connector and the first valve port into the outboard tire;

blowing residual sealant fluid in the manifold into the tire with compressed gas;

returning the valve core to the valve stem and screwing the valve core into place by translation and rotation of the secondary shaft; and disconnecting the first manifold from the first valve port; and II) providing a second manifold having an anterior portion with a connector that is dimensioned for passing through the first and second access apertures and a posterior portion;

passing the anterior portion through the first and second access apertures;

sealingly connecting the connector to the second valve port to prevent pressure loss;

advancing a valve core engaging element attached to a control rod through the connector and engaging the valve core inside the valve stem port;

unscrewing the valve core by rotation of the control rod by a control element at the posterior portion away from the access apertures;

retracting the valve core back to the posterior portion without releasing tire pressure;

introducing tire sealant and balancing fluid from the posterior portion forward of the valve core through the connector and the valve port and into the inboard tire;

blowing residual sealant fluid in the manifold into the tire with compressed gas;

returning the valve core to the valve stem and screwing the valve core in place by translation and rotation of the control shaft; and disconnecting the second manifold from the second valve port.

6. The method of claim 5, further comprising the preliminary steps of:

engaging each valve stem at the valve stem port with a levered bender; and bending the valve stem with the bender to position the stem port at a favorable position for application of the first or second manifold.

7. Apparatus for injecting tire sealant and balancing fluid into two inflated tires mounted side by side on a dual wheel that has a removable threaded valve core in a valve stem port in a valve stem for each tire, in which the first valve stem port is for the outboard tire and is inwardly directed adjacent a first access aperture in the wheel and the second valve stem port is for the inboard tire and is outwardly directed and accessible through the first access aperture and a second access aperture in series, the apparatus comprising:

I) a first manifold for use with the first valve stem, the first manifold comprising:

an anterior portion connected to a posterior portion, the anterior portion dimensioned for passing through the first access aperture and having:

a first body member with an elongate straight axial bore open at a first end that is provided with a connector means for sealed communication with the first valve port and closed at a second end by a wall with an axial hole therethrough;

an elongate control shaft extending through the axial hole and having a first shaft end outside the wall and a second shaft end within the bore that is provided with a valve engaging element;

control means connected to the first shaft end for rotating the shaft and valve core and for axial translation of the shaft and a valve core to move the valve core to a storage position in the bore adjacent the wall;

the control means further comprising a secondary shaft rotatably mounted parallel to the control shaft and coupled to the first shaft end by gear means for rotating the control shaft in a direction opposite the direction of rotation of the secondary shaft, the secondary shaft being longer than the control shaft and terminating in the posterior portion in a control element for operator rotation and translation away from the access apertures;

a lateral bore in the body member communicating at a first end with the axial bore between the storage position and the open end and communicating at a second end with a tubular passage extending to the posterior portion where the tubular passage communicates with a valve and connector for connection to a supply of tire sealant and balancing fluid and a valve, gauge and connector for connection to a source of compressed gas; and II) a second manifold for use with the second valve stem, the second manifold comprising:

an anterior portion connected to a posterior portion, the anterior portion dimensioned for passing through the first and second access apertures and having:

an elongate body member with a through axial bore open at a first end that is provided with a connector means for sealed communication with the second valve port, the connector means being provided with a remote control for operation outside the first and second apertures;

the posterior portion connected to the body member and having an axial passage coaxial with the axial bore in the body member, the passage terminating in a wall with an axial hole therethrough;

an elongate control shaft passing through the axial hole and having a first shaft end outside the wall and a second shaft end within the passage that is provided with a valve core engaging element;

shaft control means connected to the first shaft end for rotating the shaft and for axial translation of the shaft and a valve core engaged by the valve core engaging element to move the valve core from the valve stem through the bore and the passage to a storage position in the passage adjacent the wall;

a lateral bore in the posterior portion communicating at a first end with the axial passage between the storage position and the elongate body member connection, and communicating at a second end with a valve and connector for connecting to a supply of tire sealant and balancing fluid and a valve, gauge and connector for connection to a source of compressed gas.

8. Apparatus for injecting tire sealant and balancing fluid into two inflated tires mounted side by side on a dual wheel that has a removable threaded valve core in a valve stem port in a valve stem for each tire, in which the first valve stem port is for the outboard tire and is inwardly directed adjacent a first access aperture in the wheel and the second valve stem port is for the inboard tire and is outwardly directed and accessible through the first access aperture and a second access aperture in series, the apparatus comprising:

I) first means for sealingly engaging the first and second valve stem ports said first means passing through at least one of said first access aperture and said second access aperture when in sealing position;

II) second means for screwing, unscrewing and translating said valve core for movement between an operating condition in one of said first and second valve stem ports and a storage position in said first means, said second means being within said first means and manually operable from outside said wheel; and III) means for introducing a tire sealant and balancing fluid stream through said first and second tire stem ports, while said valve stem core is in said storage position and away from said stream.

9. The apparatus according to claim 8, further comprising:

means for blowing tire sealant and balancing fluid from said tire stem port into said tire with compressed gas prior to reinstalling said valve core in said valve stem port.

* * * * *